US008646176B2

(12) United States Patent
Urbaniak et al.

(10) Patent No.: US 8,646,176 B2
(45) Date of Patent: Feb. 11, 2014

(54) PROCEDURE FOR COVERING AN ELECTRICAL CONDUCTOR WITH A FLEXIBLE SEAL ELEMENT

(75) Inventors: Andreas Urbaniak, Muenster (DE); Rudolf Maron, Remscheid (DE)

(73) Assignee: Delphi Technologies, Inc., Troy, MI (US)

( * ) Notice: Subject to any disclaimer, the term of this patent is extended or adjusted under 35 U.S.C. 154(b) by 457 days.

(21) Appl. No.: 13/017,733

(22) Filed: Jan. 31, 2011

(65) Prior Publication Data
US 2011/0187057 A1    Aug. 4, 2011

(30) Foreign Application Priority Data

Feb. 4, 2010    (EP) .................................... 10001148

(51) Int. Cl.
  *H01R 43/04*    (2006.01)
(52) U.S. Cl.
  USPC ................ 29/881; 29/876; 29/882; 29/522.1; 29/523; 29/235
(58) Field of Classification Search
  USPC .................. 29/876, 881, 882, 522.1, 523, 235
  See application file for complete search history.

(56) References Cited

U.S. PATENT DOCUMENTS

| 2,657,454 A | * | 11/1953 | Duhurst .......................... 29/450 |
| 4,302,917 A | | 12/1981 | Fermvik et al. |

FOREIGN PATENT DOCUMENTS

| FR | 2 436 319 | 4/1980 |
| JP | 05299149 | 11/1993 |

OTHER PUBLICATIONS

European Search Report dated Jun. 11, 2010.

* cited by examiner

*Primary Examiner* — Peter DungBa Vo
*Assistant Examiner* — Jeffrey T Carley
(74) *Attorney, Agent, or Firm* — Robert J. Myers

(57) ABSTRACT

The present invention concerns a method for sheathing an electrical conductor with an elastic sealing element. In the method, first a through-opening is produced in the sealing element with a first equivalent diameter. Next the through-opening which has been produced with a first equivalent diameter is expanded to a second equivalent diameter, in order to be able to introduce an electrical conductor into it. Then contraction of the through-opening which has been expanded to the second equivalent diameter is brought about, in order thus to obtain sealing off of the electrical conductor from the elastic sealing element.

9 Claims, 3 Drawing Sheets

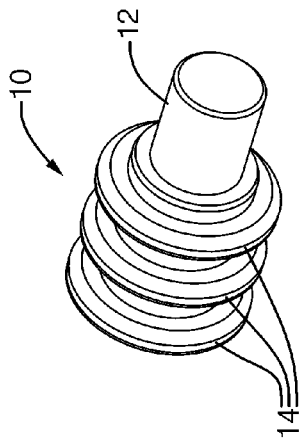
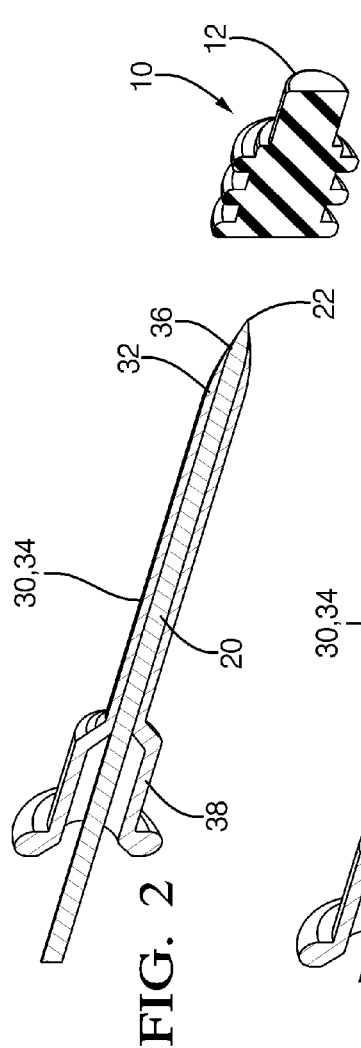
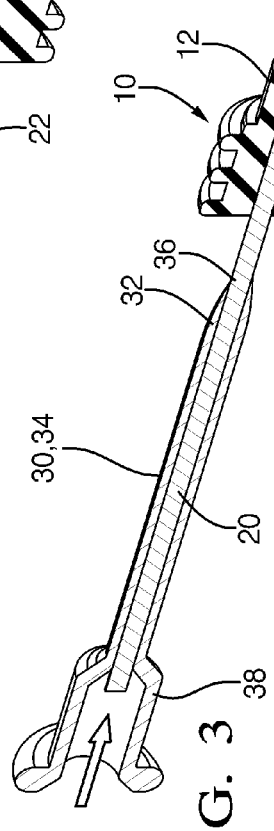
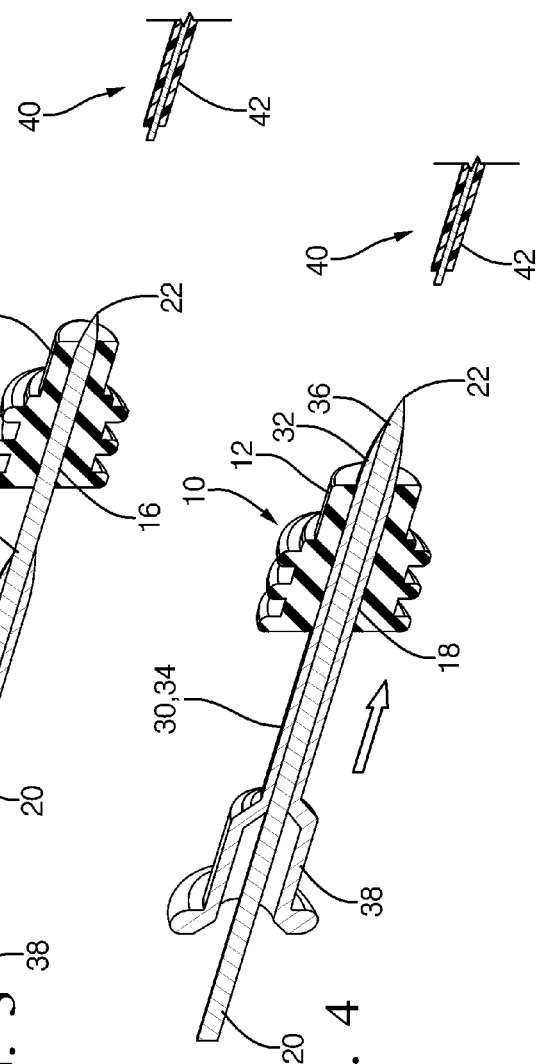

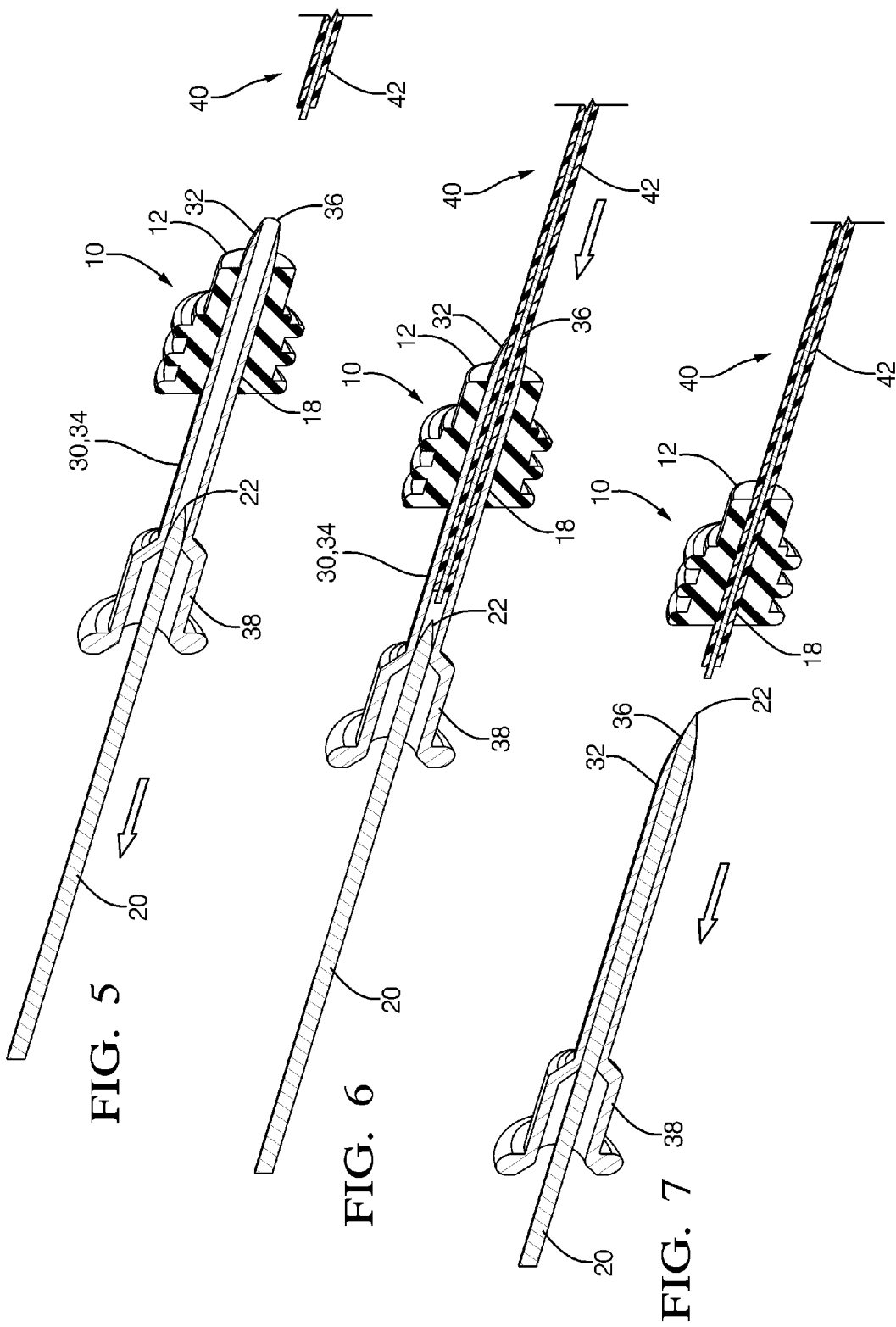

PROCEDURE FOR COVERING AN ELECTRICAL CONDUCTOR WITH A FLEXIBLE SEAL ELEMENT

TECHNICAL FIELD OF THE INVENTION

The present invention concerns a method for sheathing an electrical conductor with an elastic sealing element as well as an electrical conductor sheathed with an elastic sealing element.

BACKGROUND OF THE INVENTION

In the motor vehicle industry, endeavors are continually being made to reduce the vehicle weight in favor of fuel economy. Since usually not inconsiderable quantities of electrical conductors as well as cable harnesses composed of electrical conductors are laid in motor vehicles, the motor vehicle industry is also endeavoring to reduce the weight of cable harnesses, on account of which the copper cross-sections of the conductors are reduced to values of between approximately 0.13 mm$^2$ and approximately 0.08 mm$^2$, so that the diameter at the outer surface of the insulation of these electrical conductors with a reduced cross-sectional area is only approximately 0.8 mm.

However, this proves to be a problem insofar as electrical conductors of this kind with a reduced outside diameter can no longer be sheathed in the traditional manner with an elastic sealing element which during its manufacture by injection molding has already been made with a through-opening for receiving an electrical conductor. Thus with an inside diameter of approximately 0.65 to 0.8 mm the manufacturing limit of such through-openings passing through a sealing element is reached, as a result of which the contraction or compression force which is applied by the sealing element to an electrical conductor introduced into its through-opening is not always sufficient to ensure adequately tight sealing.

SUMMARY OF THE INVENTION

It is therefore the object of the invention to provide a method for sheathing an electrical conductor with an elastic sealing element, by which adequately tight sealing between the electrical conductor and the sealing element can be ensured even in the case of very thin electrical conductors.

This object is achieved according to the invention by the method according to claim 1 for sheathing an electrical conductor with an elastic sealing element.

According to one embodiment, the object is achieved by the fact that in the sealing element is first produced a through-opening with a first equivalent diameter, which extends substantially linearly through the sealing element. This through-opening involves a three-dimensional cut or penetration of which the equivalent diameter is preferably less than 0.1 mm. The through-opening produced in this way with a first equivalent diameter is then expanded or stretched elastically to a second equivalent diameter which is slightly larger than the respective electrical conductor which is to be sheathed with the elastic sealing element. Thus the second equivalent diameter should for example be of the order of magnitude of approximately 1 mm or more, if the electrical conductor has an outside diameter of 0.8 mm.

After the through-opening has been expanded in this way to the second equivalent diameter, an electrical conductor can then be introduced into the through-opening expanded to the second equivalent diameter, so that the electrical conductor extends completely through the sealing element. In order now to produce adequately tight sealing between the electrical conductor and the sealing element, the through-opening expanded to the second equivalent diameter is then caused to shrink or contract, with the result that tight sealing can be ensured between the electrical conductor and the elastic sealing element.

As the through-openings in the sealing element cannot always be made round, it is not the diameter that is used as the reference variable here, but the equivalent diameter; in this case it corresponds to the diameter of a round through-opening of which the inner circumference corresponds to the inner circumference of the through-opening under consideration. Likewise the cross-sectional area can be used as the reference variable, so that the equivalent diameter corresponds to the diameter of a round through-opening of which the cross-sectional area corresponds to the cross-sectional area of the through-opening under consideration.

The through-opening having a first equivalent diameter can be produced in the sealing element for example by subjecting it to a liquid or gas jet or generally a nozzle jet which cuts the desired through-opening in the sealing element with a first equivalent diameter. The through-opening produced in this way can then be expanded to the second equivalent diameter for example mechanically or thermally for example by the action of heat on the sealing element, so that after introduction of an electrical conductor into the through-opening expanded in this way, the elastic sealing element or the expanded through-opening can be caused to contract in the desired manner, for example by cooling the elastic sealing element.

Of course the method according to the invention can be carried out in the manner described above using a nozzle jet as well as mechanical and/or thermal action on the elastic sealing element; advantageous embodiments of the method according to the invention are however apparent from the following description, the drawings and in particular from the subsidiary claims.

Thus according to one embodiment it is provided that the through-opening having a first equivalent diameter is produced in the sealing element by piercing the latter with a pointed, thin and preferably round object such as for example a piercing needle of which the shaft diameter corresponds to the first equivalent diameter. The through-openings having a first equivalent diameter that are produced in this way can then be expanded to the second equivalent diameter for example in the manner described above by mechanical and/or thermal action on the elastic sealing element.

According to a further embodiment it is provided that the through-opening having a first equivalent diameter which is produced by means of a nozzle jet or a piercing needle is expanded to the second equivalent diameter by passing a hollow needle through the through-opening produced with the first equivalent diameter, of which the shaft diameter corresponds to the second equivalent diameter. Expansion of the through-opening having the first equivalent diameter to the second equivalent diameter by means of a hollow needle here proves to be advantageous insofar as introduction of the electrical conductor into the through-opening by inserting it in the hollow needle itself is facilitated by this means.

According to a further embodiment it can be provided that the electrical conductor is introduced into the through-opening which has been expanded to the second equivalent diameter, by introducing the electrical conductor into the hollow needle and then pulling the hollow needle out of the sealing element, so that the electrical conductor remains in the through-opening which then contracts by itself due to the elasticity of the sealing element. Due to the fact that the through-opening having the first equivalent diameter has been produced with an equivalent diameter which is smaller than the outside diameter of the electrical wire, tight sealing can therefore be ensured between the electrical conductor and the elastic sealing element. On account of the elasticity of the material from which the sealing element is made, the through-opening has a tendency to contract again after removal of the hollow needle, with the result that the electrical conductor has applied to it a compressive force by which not only is tight sealing produced in relation to the sealing element, but the electrical conductor is also held frictionally in the sealing element. In other words, therefore, by pulling the hollow needle out of the sealing element in the desired manner, contraction of the through-opening which has been expanded to the second equivalent diameter is brought about in order to seal off the electrical conductor from the elastic sealing element.

To prevent material from being removed at the inner circumference of the through-opening by the sharp front edge at the tip of the hollow needle when the hollow needle is introduced into the through-opening having the first equivalent diameter, according to a further embodiment it is provided that the hollow needle is passed through the through-opening produced with the first equivalent diameter, by placing the hollow needle on the piercing needle, which is still located in the sealing body, and sliding it over it. The through-opening with the first diameter does not therefore have the opportunity to contract, before introduction of the hollow needle into the sealing body, to a diameter which is smaller than the first equivalent diameter, as a result of which, when the hollow needle is introduced into the through-opening, no material is removed from the inner circumference of the through-opening particularly if the inside diameter of the hollow needle corresponds substantially to the outside diameter of the piercing needle.

Admittedly, the electrical conductor can be introduced into the hollow needle after the piercing needle has been pulled out of the hollow needle. As the electrical conductor has, however, a certain risk of buckling due to its very small diameter, it may prove advantageous to introduce the electrical conductor into the hollow needle already while the piercing needle is being pulled out of the hollow needle. Thus for example the electrical conductor can be attached to the tip of the piercing needle which is stuck through the sealing body, so that the electrical conductor is pulled into the hollow needle by the fact that the piercing needle is pulled out of the hollow needle. The electrical conductor is thus introduced into the hollow needle in the same direction in which the piercing needle is pulled out of the hollow needle.

From a manufacturing point of view, however, it may also prove advantageous to introduce the electrical conductor into the hollow needle in the same direction in which the piercing needle is introduced into the hollow needle. In this case any apparatuses and insertion aids for introducing the electrical conductor and piercing needle into the hollow needle have to be provided on only one side of the sealing element, as a result of which these apparatuses and insertion aids can be assigned a dual function.

As has already been indicated above, production of the through-opening with the first equivalent diameter and/or expansion of the through-opening which has been produced with a first equivalent diameter to a second equivalent diameter should be effected without removal of material, so that sealing as tight as possible between the electrical conductor and the sealing element can be ensured as a result of contraction of the through-opening after removal of the hollow needle from the sealing element has taken place. If, on the other hand, material were to be removed along the inner circumference of the through-opening during production or expansion of the through-opening, there would be a risk of a gaping gap remaining between the sealing element and the electrical conductor at the point of material removal after the hollow needle is pulled out of the sealing element, so that tight sealing is not guaranteed there.

Although production of the through-opening with the first equivalent diameter and expansion thereof to a second equivalent diameter in the manner described above can be effected in two successive steps, from a manufacturing point of view it may prove advantageous to perform these two steps immediately following one another or smoothly merging with one another, by sticking the piercing needle together with the hollow needle which has been slid over it in the sealing element. Particularly if the tip of the hollow needle carries on continuously in the tip of the piercing needle, the through-opening during its expansion to the second equivalent diameter has the first equivalent diameter only for a very short time, so that in this embodiment too—even if only for a very short time—first a through-opening with a first equivalent diameter is produced, which is then immediately further expanded.

In order not to remove material from the inner circumference of the through-opening, or to remove as little material as possible, on introduction of the hollow needle into the through-opening with the first equivalent diameter, according to yet another embodiment the hollow needle is designed with a frustoconical tip which tapers from a diameter at the needle shaft corresponding to the second equivalent diameter, to a diameter at the needle tip corresponding to the first equivalent diameter. The hollow needle with its needle tip therefore abuts closely against the piercing needle when it is slid over the piercing needle, as a result of which no material or at least hardly any material is removed along the inner circumference of the through-opening with the first equivalent diameter when the hollow needle is slid into the through-opening.

Below, the invention will now be described purely by way of example with the aid of an exemplary embodiment with reference to the attached drawings, in which:

BRIEF DESCRIPTION OF THE DRAWINGS

FIG. 1 is a perspective view of an exemplary elastic sealing element;

FIGS. 2 to 7 show the procedure of an exemplary embodiment of a method for sheathing an electrical conductor with an elastic sealing element.

DETAILED DESCRIPTION OF THE INVENTION

Figure 8:
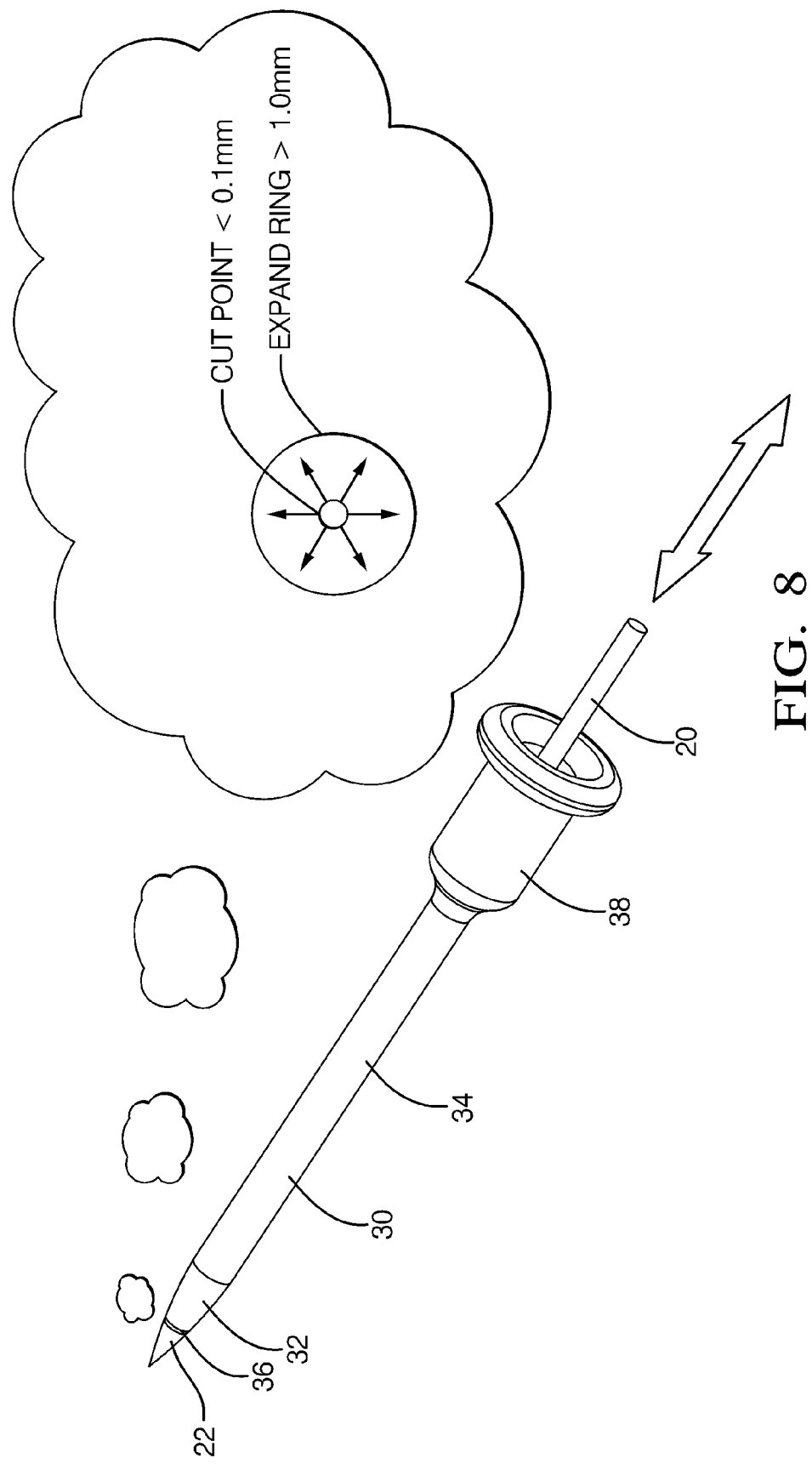
FIG. 8 shows a perspective view of a hollow needle which has been slid over a piercing needle.

FIG. 1 shows an elastic sealing element 10 in a perspective view, which for example has been made by injection molding as a solid body from a silicone material, for example. The sealing element 10 here has a substantially cylindrical main body 12 which in the axial direction is surrounded by three spaced-apart sealing rings 14 which are constructed in one piece with the main body 12.

FIG. 2 shows the initial position of the method according to the invention, before the piercing needle 20 and the hollow needle 30 are inserted in the axial direction in the main body 12 of the sealing element 10 and passed through it. As can be seen from the sectional view of FIG. 2, in which the hollow needle 30 has been slid over the piercing needle 20, the hollow needle 30 has a frustoconical tip 32 which tapers from the needle shaft 34, of which the diameter corresponds to the second equivalent diameter to be made in the sealing element 10 of the order of magnitude of approximately 1 mm, to its needle tip at the front end 36 of the tip 32 to a first equivalent diameter to be made in the sealing element 10 of the order of magnitude of approximately 0.1 mm.

In the drawings of FIGS. 2 and 8 it can be seen that the tip 32 of the hollow needle 30 carries on continuously in the tip 22 of the piercing needle 20 which is arranged slidably in the hollow needle 30, which means that the outside diameter of the piercing needle 20 corresponds substantially to the inside diameter of the hollow needle 30 or to the diameter of the hollow needle 30 at its front end 36. At its end opposite its frustoconical tip 32, the hollow needle 30 has an insertion funnel 38 which serves to facilitate introduction of the piercing needle 20 into the hollow needle 30 and if necessary also the introduction of an electrical conductor into the hollow needle 30.

Below, an embodiment of the method according to the invention will now be essentially described with reference to FIGS. 3 to 7. After the two needles 20, 30 inserted one inside the other as in FIG. 2 have been axially offset from the sealing element 10 in the manner shown, a first step involves beginning to make a through-opening 16 with a first equivalent diameter in the sealing element 10, by sticking the piercing needle 20 tip 22 first in the main body 12 of the sealing element 10 and passing it through the latter, as can be seen from the transition from FIG. 2 to FIG. 3.

After a through-opening 16 with a first equivalent diameter has been produced in the sealing element 10 in this way, in a further step the through-opening 16 with the first equivalent diameter is then expanded to a second equivalent diameter, by sliding the hollow needle 30 tip 32 first over the piercing needle 20 through the main body 12 of the sealing element 10 and so sliding it through the previously made through-opening 16 with the first equivalent diameter, as shown clearly in FIG. 4.

After a through-opening 18 with a second equivalent diameter of approximately 1 mm has been made in this way in the main body 12 of the sealing element 10, the piercing needle 20 is then retracted again as in FIG. 5, in order to create space inside the hollow needle 30 for receiving an electrical conductor 40 which is surrounded with insulation 42 and which in FIG. 5 is located at an axial distance from the tip 32 of the hollow needle 30 still located in the sealing element 10, and has an outside diameter of approximately 0.8 mm.

In a further step, the electrical conductor 40 can therefore now be introduced into the through-opening 18 expanded to the second equivalent diameter or into the interior of the hollow needle 30. As an alternative to the embodiment shown in the figures, however, the electrical conductor can also, at the same time as retraction of the piercing needle 20 from the hollow needle 30, be introduced into the interior thereof. For this purpose, for example the front end of the electrical conductor 40 could be attached to the tip 22 of the piercing needle 20 or to the end of the piercing needle 20 opposite the tip 22 of the piercing needle 20, in order to pull the electrical conductor 40 with the aid of the piercing needle 20 into the interior of the hollow needle 30, by pulling the piercing needle 20 out of the hollow needle 30.

After the electrical conductor 40 has been introduced into the interior of the hollow needle 30 in one of the ways described above, the hollow needle 30 is then pulled out of the sealing element 10, so that only the electrical conductor 40 remains in the sealing element 10, as shown in FIG. 7. Due to pulling the hollow needle 30 out of the sealing element 10, at the same time the sealing element 10 as a whole or the through-opening 18 previously expanded to the second equivalent diameter is caused or allowed to contract to approximately its first equivalent diameter of the order of magnitude of 0.1 mm, so that not only can tight sealing be ensured between the electrical conductor 40 and the sealing element 10, but also a frictional connection between the electrical conductor 40 and the sealing element 10, by which the sealing element 10 is held reliably on the electrical conductor 40.

As far as one element being pulled out of the other element is mentioned in the description above, this means that the one element is completely removed from the other element, as this applies to the hollow needle 30, which as in FIG. 7 is completely pulled out of the sealing element 10.

By contrast, the wording according to which one element is pulled out of the other element does not necessarily mean that the one element is completely pulled out of the other element, as this applies to the piercing needle 20, which as in FIG. 5 has been only partly pulled out of the hollow needle 30.

We claim:

1. A method for sheathing an electrical conductor with an elastic sealing element, comprising the steps of:
    producing a through-opening in the elastic sealing element;
    expanding the through-opening produced;
    introducing the electrical conductor into the expanded through-opening, comprising attaching the electrical conductor to the piercing needle; and pulling the electrical conductor with the aid of the piercing needle into the interior of the hollow needle as the piercing needle is pulled out of the hollow needle; and
    causing contraction of the expanded through-opening, thereby sealing the electrical conductor with the elastic sealing element, wherein the through-opening with a first equivalent diameter is produced in the sealing element by piercing the sealing element with a piercing needle, then by expanding the through-opening from the first equivalent diameter to a second equivalent diameter by passing a hollow needle having a frustoconical tip through the through-opening produced with the first equivalent diameter.

2. The method according to claim 1, wherein the electrical conductor is introduced into the through-opening which has been expanded to the second equivalent diameter by introducing the electrical conductor into the hollow needle and then pulling the hollow needle out of the sealing element, so that the electrical conductor remains in the through-opening which then contracts by itself due to the elasticity of the sealing element.

3. The method according to claim 1 or 2, wherein contraction of the through-opening which has been expanded to the second equivalent diameter is brought about by pulling the hollow needle out of the sealing element.

4. The method according to claim 1 or 2, wherein the hollow needle is passed through the through-opening which has been produced with a first equivalent diameter, by sliding the hollow needle over the piercing needle located in the sealing body.

5. The method according to claim 4, wherein the piercing needle is pulled out of the hollow needle after the hollow needle has been slid over the piercing needle located in the sealing body.

6. The method according to claim 2, wherein the electrical conductor is introduced into the hollow needle, either after the piercing needle has been pulled out of the hollow needle or while the piercing needle is being pulled out of the hollow needle.

7. The method according to claim 6, wherein the electrical conductor is introduced into the hollow needle in the same direction in which the piercing needle is pulled out of the hollow needle.

8. The method according to claim 6, wherein the electrical conductor is introduced into the hollow needle in the same direction in which the piercing needle is introduced into the hollow needle.

9. The method according to claim 1, wherein the outside diameter of the piercing needle corresponds with the diameter of a tip of the hollow needle.

* * * * *